June 17, 1947.  L. W. SCHRADER  2,422,502

EXPANSION JOINT

Filed Sept. 15, 1943

Leo W. Schrader Inventor
By P. L. Young Attorney

UNITED STATES PATENT OFFICE 2,422,502

EXPANSION JOINT

Leo W. Schrader, Elizabeth, N. J., assignor to Standard Oil Development Company, a corporation of Delaware Application September 15, 1943, Serial No. 502,439

1 Claim. (Cl. 285—162)

This invention relates to expansion joints and in particular to expansion joints adapted for high temperature operation.

In piping systems in order to take care of the dimensional changes occurring as a result of temperature variation, bends in the pipe are often provided. The bend in the pipe provides sufficient flexibility to absorb the dimensional changes due to temperature and also prevent excessive strains upon the pipe joints and connecting equipment. Where the piping is relatively short and there is much branching, bends in the pipe probably furnish satisfactory means for absorption of the effects of temperature variation. However, where the piping is of considerable length and there are relatively few branches, slip joints and bellows type joints are considered more advantageous. Bellows joints and slip joints have the following advantages:

1. Less material involved
2. Less radiating surface and consequent heat loss
3. More direct flow
4. Greater convenience of support and anchorage
5. Better suited for underground conduits.

This invention is concerned with a slip type joint which has not only the above advantages but also has provision for cooling so that undue strain upon the joint due to temperature is considerably minimized and gasket material is in general subjected to lower temperatures than that of operation in the unit of which it is part.

One of the particular features of the device of the present invention is that between the sliding elements of the slip joint is a relatively large annular chamber within which is disposed at either end packing material such as asbestos and means for circulating a cooling fluid. A suitable embodiment involves the use of an annular spacer with rings at each end to contact the packing, and of open web structure between the rings to permit free circulation of the cooling medium. The ring usually has close clearance points, with the outer casing and inner sliding member so as to furnish a guided movement for the movable parts of the joint under line strains due mainly to temperature variation. The amount of slippage is determined by the distance between the free end of the inner sliding member and inner shoulder portion of the outer casing. The inner sliding member may be insulated on the inside as an added advantageous feature. Also, the packing material at the ends of the annular chamber between the casing and inner sliding member or packing rings is not of extensive thickness so as to permit cooling of the metal across the width of this packing material.

Figure 1:
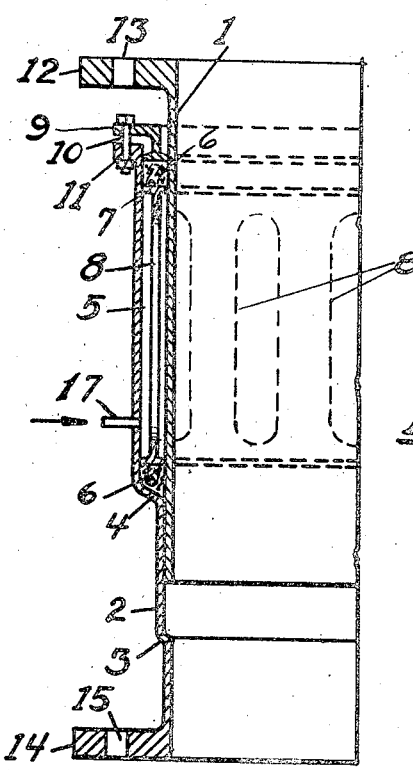
Figure 2:
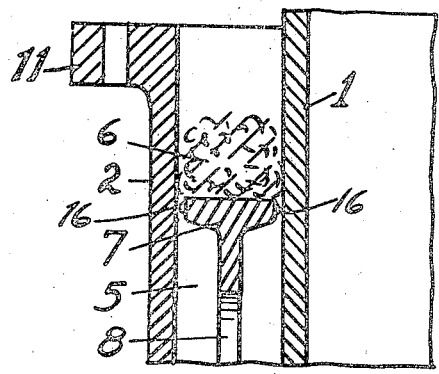

In a particular embodiment of the invention, as shown in Figs. 1 and 2, an inner tube 1 slides within the casing 2. The casing 2 has two shoulders 3 and 4, respectively. Between the sliding element 1 and the casing 2 above the shoulder 4 is the annular chamber 5. At the lower end of the annular chamber and also at the top of the chamber, packing material 6, such as asbestos, is disposed. Confined within the annular chamber and the packing material is a lantern ring 7 of open web construction 8 and of flanged ends of about $\frac{1}{16}$" clearance from tube 1 and casing 2. In Fig. 2 an enlarged showing is presented of the device about the area of meeting of the upper lantern ring and the packing in order to illustrate that the periphery has points 16 of about 0.001 clearance at intervals. The packing material in the lower portion of the device is confined, and compressed, within the annular space between the sliding member 1 and casing 2 and between the shoulder 4 and the lantern 7, while the packing material in the upper portion is held in place and compressed between the member 1 and casing 2 and the lantern ring 7 and the ring portion of the annular member 9 which is adjustable through nut and bolt connection 10 to the upper flange 11 of the casing 2. Thus, by adjusting connection 10, pressure on the packing material 6 in both portions of the device can be varied. The sliding member 1 has a flange 12 with provision for another end bolt connection 13. Also the outer casing 2 has an outwardly directed flange 14 for connection to piping. The cooling fluid is shown as being admitted through line 17, while the exit on the opposite side of the joint is not shown.

Thus the device illustrated has an amount of slippage determined by the freedom of movement of the end of the sliding member 1 within the outer casing 2 before contacting the shoulder 3. The expansion elements and packing are cooled by the passage of cooling media such as steam through the annular chamber 5. The flanged ends of the lantern ring 7 with the guide points 16 of close clearance at intervals provide the guides for the movement of the sliding member 1 within the casing 2 and due to the compression of the packing elements 6 above and below the lantern ring 7 by means of the ring 9 there is no leakage of any fluids passing through the inside of the joint countercurrently.

The slip joint of this invention is particularly advantageous as a part of equipment adapted to the heat treatment of hydrocarbons. The invention is not, however, limited to such application but may be utilized in any piping system, in which temperature changes may be encountered. A particularly advantageous use of the device of the invention is in regard to the cracking of hydrocarbons with a powdered catalyst, in which process temperatures of between 700° F. and 1100° F. or higher are often employed and in the regeneration of the powdered catalyst temperatures as high as 1400° F. may be used. With such high temperatures the expansion of the piping system frequently involving pipe sizes up to 72" in diameter becomes a factor of importance and one of the problems in existing equipment was concerned with the development of suitable expansion joints which could be used under such conditions. Satisfactory provision within the device of this invention for cooling the joint and also for preventing leakage of materials passing through the inside of the joint are particularly advantageous features in the processing of hydrocarbons using gas solid dispersions.

What is claimed is:

An expansion pipe joint for temperatures between about 700° F. and 1400° F. comprising a casing and a sliding member therefor, an annular chamber between portions of said casing and said sliding member, compressible heat-resistant packing at each end of said chamber separated by a lantern ring, said lantern ring having terminal flanged ends with circumferential knob-like projections as spacer elements thereon between rim of said flanged ends and inner wall of said annular chamber, said lantern ring also having an intermediate open web portion, and a compression member at one end of said annular chamber for compacting said packing material between opposite ends of said annular chamber and said terminal flanged ends of said lantern ring, and means for injecting a cooling fluid within said annular chamber.

LEO W. SCHRADER.

REFERENCES CITED

The following references are of record in the file of this patent:

UNITED STATES PATENTS

| Number | Name | Date |
|---|---|---|
| 1,914,741 | Gysling | June 20, 1933 |
| 1,990,519 | Bigelow | Feb. 12, 1935 |
| Re. 5,551 | Stevens | Aug. 26, 1873 |
| 574,353 | Garlock | Dec. 29, 1895 |
| 1,873,267 | Bigelow et al. | Aug. 23, 1932 |